United States Patent
Preuss et al.

(10) Patent No.: US 11,326,681 B2
(45) Date of Patent: May 10, 2022

(54) ELASTIC GEAR WHEEL OF A HARMONIC DRIVE

(71) Applicant: SCHAEFFLER TECHNOLOGIES AG & CO. KG, Herzogenaurach (DE)

(72) Inventors: Tobias Preuss, Erlangen (DE); Rainer Ottersbach, Aurachtal (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 916 days.

(21) Appl. No.: 16/063,407

(22) PCT Filed: Oct. 13, 2016

(86) PCT No.: PCT/DE2016/200470
§ 371 (c)(1),
(2) Date: Jun. 18, 2018

(87) PCT Pub. No.: WO2017/101917
PCT Pub. Date: Jun. 22, 2017

(65) Prior Publication Data
US 2018/0372205 A1  Dec. 27, 2018

(30) Foreign Application Priority Data
Dec. 18, 2015 (DE) .......................... 102015225851.3

(51) Int. Cl.
*F16H 49/00* (2006.01)
*F01L 1/352* (2006.01)

(52) U.S. Cl.
CPC ............ *F16H 49/001* (2013.01); *F01L 1/352* (2013.01); *F01L 2001/3521* (2013.01); *F16H 2049/003* (2013.01)

(58) Field of Classification Search
CPC ...................................................... F16H 49/001
USPC ............................................................ 74/640
See application file for complete search history.

(56) References Cited

U.S. PATENT DOCUMENTS

| | | | | |
|---|---|---|---|---|
| 4,619,156 A | * | 10/1986 | Kiryu | F16H 49/001 74/640 |
| 5,388,483 A | * | 2/1995 | Ishida | F16H 1/32 74/640 |
| 5,775,178 A | * | 7/1998 | Asawa | F16H 49/001 74/640 |
| 7,409,891 B2 | * | 8/2008 | Takemura | F16H 49/001 74/640 |

(Continued)

FOREIGN PATENT DOCUMENTS

| | | |
|---|---|---|
| CN | 201982606 U | 9/2011 |
| CN | 104791456 A | 7/2015 |

(Continued)

OTHER PUBLICATIONS

International Search Report for International Application No. PCT/DE2016/200470 dated Jan. 18, 2017.
(Continued)

*Primary Examiner* — Ha Dinh Ho
(74) *Attorney, Agent, or Firm* — Rutan & Tucker LLP; Hani Z. Sayed

(57) ABSTRACT

An elastic gear wheel for a harmonic drive has a cylinder portion with tooth, and a flange which is integrally designed with the cylinder portion. The flange has recesses for fastening, and through-apertures for fastening.

12 Claims, 3 Drawing Sheets

(56) References Cited

U.S. PATENT DOCUMENTS

Figure 1:
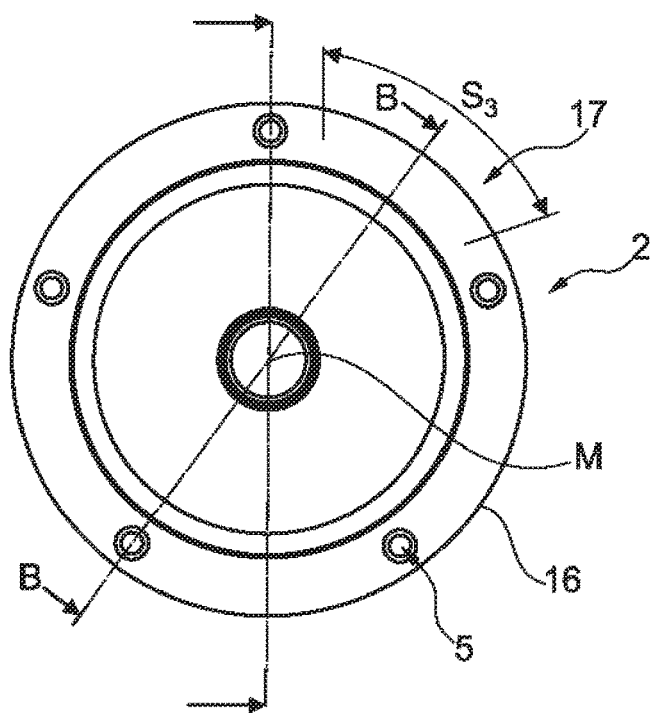

| | | | |
|---|---|---|---|
| 9,493,230 B2 * | 11/2016 | Balsiger | ............... F16H 49/001 |
| 9,840,947 B2 | 12/2017 | Kohrs et al. | |
| 9,920,660 B2 | 3/2018 | Kohrs | |
| 2008/0210182 A1 | 9/2008 | Schaefer et al. | |

FOREIGN PATENT DOCUMENTS

| | | | |
|---|---|---|---|
| DE | 102013220221 A1 | 4/2015 | |
| EP | 0514829 B1 | 8/1996 | |
| EP | 0741256 B1 | 11/2000 | |
| JP | 4902227 B2 | 3/2012 | |

OTHER PUBLICATIONS

German Office Action for German Application No. 10 2015 225 851.3 dated Aug. 11, 2016.

* cited by examiner

ELASTIC GEAR WHEEL OF A HARMONIC DRIVE

CROSS-REFERENCE TO RELATED APPLICATIONS

This application is the U.S. National Phase of PCT/DE2016/200470 filed Oct. 13, 2016, which claims priority to DE 102015225851.3 filed Dec. 18, 2015, the entire disclosures of which are incorporated by reference herein.

TECHNICAL FIELD

This disclosure relates to an elastic gear wheel for a harmonic drive, in particular suitable for use in a device for modifying the compression ratio of an internal combustion engine, wherein the gear wheel has a flange that is to be attached to a housing component.

BACKGROUND

Harmonic drives, which include an elastic gear wheel, are known by way of example from EP 0 514 829 B1 and EP 0 741 256 B1. In both cases, the flexible gear wheel has a thick hub region that can be attached to a housing component of the gearing, wherein numerous attachment points are provided. The flexibility of the gear wheel is obtained through regions that have a thin cross section in the gear wheel. The known gearings are to be used in small robots or precision machines.

Harmonic drives for use in internal combustion engines, specifically in electric camshaft timers of piston engines, are known by way of example from DE 10 2004 009 128 A1, DE 10 2013 220 220 A1, and DE 10 2014 202 060 A1.

When shifting, high tensions result from deformation in an elastic gear wheel that has a reinforcing flange. The component may become permanently damaged in particular at the transition points where the elastic gear wheel is connected to a large chain wheel. To prevent this damage, it is proposed in U.S. Pat. No. 4,619,156 A1 to provide holes in the flange region, or to connect the two regions with a bellows. Both variations enable a radial flexibility that increases the service life of the component. This type of gear wheel, however, is only suitable for transferring lower torques.

SUMMARY

An object of this disclosure is to further develop a harmonic drive with respect to the prior art, in particular regarding a particularly beneficial relationship between the deformability of an elastic, toothed gear element and the service life of the gearing, wherein a more compact construction and a particular suitability for devices for adjusting the compression ratio of piston engines are to be obtained.

A flexible gear wheel of a harmonic drive has the features claimed and described herein.

A gearing that has at least one elastic gear wheel according to the disclosure comprises a housing component to which the elastic gear wheel is attached. The elastic gear wheel may have the shape of a cup, wherein it may be part of a bevel gear with a cup-shaped housing.

A radially outward directed flange of the gear wheel is retained on the housing component via a connection assembly, which has numerous holes for attachment, in particular screw holes, for securing the elastic gear wheel along the circumference to another component, e.g. a chain wheel. The attachment holes are at a spacing to the outer edge of the flange. The attachment holes may be circular, and their diameter is adapted to the attachment screws.

The elastic gear wheel retained with directional reinforcement on the housing has a cylindrical, toothed section adjoining the flange, i.e. the section extending radially outward, serving as a cylindrical section. The toothing of the cylindrical section may be an outer toothing, which meshes with an inner toothing on the housing of the gearing. The elastic gear wheel formed by two sections, specifically the cylindrical section and the flat, annular section, is also referred to as an elastic L-ring or a flanged sleeve.

In addition to the attachment holes, according to the disclosure the flange also has further through holes. These further through holes can become deformed during the operation of a harmonic drive that has the gear wheel according to the disclosure, thus resolving the conflict between the deformation of the cylindrical section and the reinforcement of the flange. The flange is subjected to heavy loads in the region of the attachment holes. It is securely attached therewith to a component connected to the gearing for conjoint rotation therewith, or with another non-rotatable component. As a result, it is more difficult for the flange to become deformed in the region of this attachment. At the same time, the thickness of the flange is reduced at these points due to the attachment holes, such that this is where the greatest loads occur, which may lead to breaks if the design according to the disclosure is not implemented here.

Although the flange is weakened by the through holes provided according to the disclosure, the flange is simultaneously relieved of the load resulting from the dynamic deformations, such that the gear wheel is able to creep. Reducing the stiffness of the flange results in reductions in the tensions and expansions in the heavily loaded transitional radius. The elastic gear wheel is made more elastic in the critically loaded regions as a result, while in the regions subject to less deformation, the elastic gear wheel is not weakened. The holes provided only for reducing the thickness, in comparison, allow for a significantly greater deformation of the material, thus reducing the tension spikes and counteracting material fatigue.

It is therefore provided that the relieving through holes be located in the spatial proximity of the attachment holes. The structural weakening of the flange can be introduced by a partial hole in the region where force is applied to the chain wheel flange.

It is furthermore disclosed that the through holes be adapted to the shape of the attachment holes. If these are formed, for example, as circular bore-holes, the through holes can assume the radius of the bore, and be formed as bowed elongated holes, such that the spacing between the two holes remains constant over a partial angular range.

In one embodiment, the through holes are disposed along the circumference between the attachment holes. They are thus at the same radial position, and may be disposed symmetrically between two attachment holes. In one embodiment, it is thus provided that precisely one through hole is disposed between each pair of attachment holes. In another embodiment, there can also be numerous through holes between each pair of attachment holes, wherein these then each can have the same shape.

In another embodiment it is provided that the through holes are disposed radially between the attachment holes and the cylindrical section. This is advantageous, because the deformation can then be braced against as close as possible to the stabilizing flange. A configuration in which the angular extension of the through holes crosses over the attachment holes is also contemplated.

The through holes are elongated in one design. The elongated holes may have a substantially constant width, and may extend along the circumference. It is not necessary for the elongated holes to exhibit a constant curvature; instead, it is provided that these are adapted to the shape of the attachment holes. In addition, it can also be provided in another design that the width of the elongated holes varies, in order to ensure an optimal deformation.

The width of the elongated holes may be less than the width of the through holes, and the length of the elongated holes may be greater than the length of the through holes.

The number of through holes can be curved toward the attachment holes, thus surrounding them over a specific angular range. Because the area directly surrounding the attachment holes is particularly rigid, a material relief in the immediate proximity of the attachment holes is particularly effective. In particular, the through holes can be curved such that they form partial annular grooves around the attachment holes.

In embodiments that can be produced, the wall thickness of the cylindrical section of the gear wheel, excluding the teeth, is identical to the wall thickness of the flange. In particular, the flange is also not thicker in the attachment regions. The gear wheel can be produced as a single piece from sheet metal in a particularly advantageous manner. It is not necessary to remove material in a targeted manner in order to produce flexibility in the axial direction.

The flange of the elastic gear wheel extending in the radial direction, lying substantially in a single plane, can be retained on a housing component using bolts, wherein intermediate parts, e.g. in the form of washers or more complex spacers can be inserted between the bolts, the flange, and the housing component, in order to produce an additional axial tolerance. The entire flange may be flat.

The housing component to which the elastic gear wheel is attached can be a drive gear of the gearing that can be driven via a drive mechanism. Otherwise, such a drive gear may be connected to said housing component for conjoint rotation therewith.

The conflict between the desired circumferential rigidity and the desired axial flexibility in attaching the elastic gear wheel to the housing can be resolved particularly well by embodiments in which there are no more than five attachment points, e.g. precisely five attachment points.

An advantage of this disclosure is in particular that rotational movements can be transferred with particularly high precision through the partial axial decoupling of the cylindrical section of the elastic gear wheel from the flange, wherein operational radial deformations of a toothed, cylindrical section of the gear wheel remain unobstructed.

The gearing in accordance with this patent application is particularly suitable for use in an electrical camshaft timer with an electric timing shaft. By way of example, reference is made in this context to DE 10 2013 220 220 A1, and DE 10 2013 220 221 A1. The gearing can also be used in a device used for adjusting a variable compression in a piston engine.

BRIEF DESCRIPTION

Figure 2:
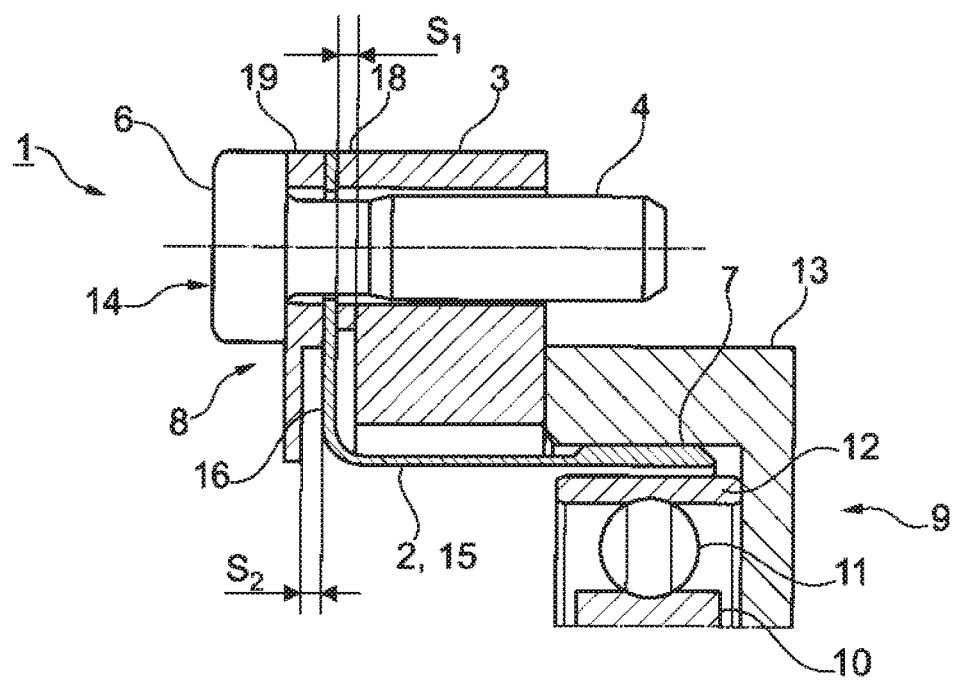
Figure 3:
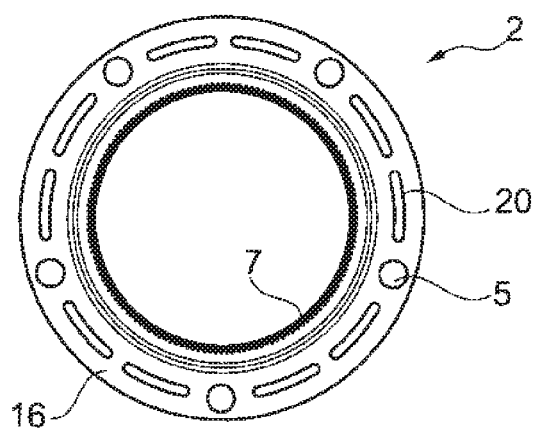
Figure 4:
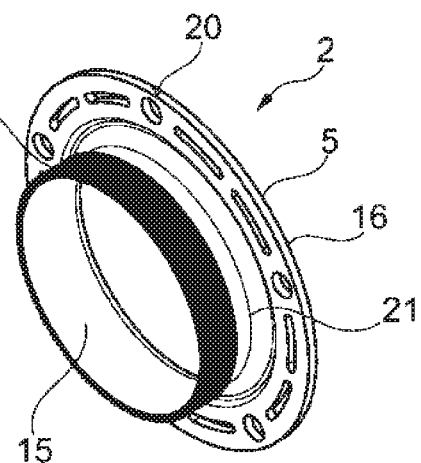
Figure 5:
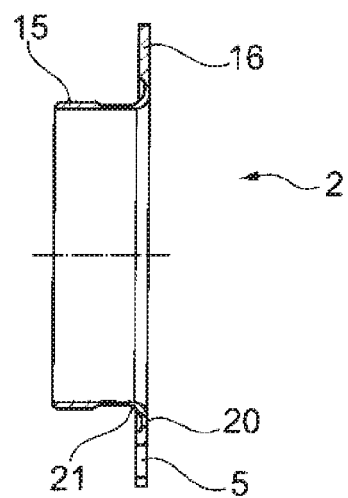
Figure 6:
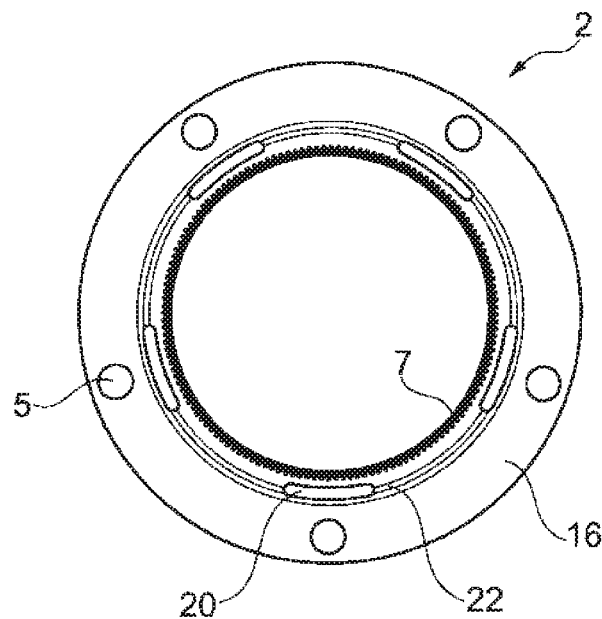
Figure 7:
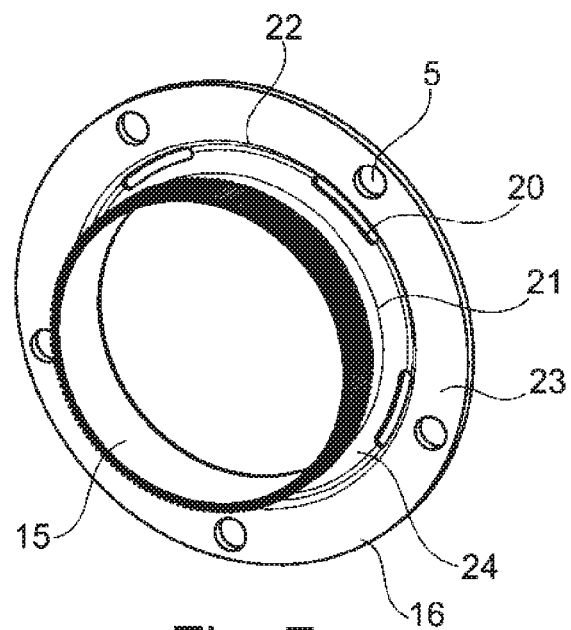

The disclosure shall be explained in greater detail below based on drawings of exemplary embodiments. Therein, schematically in part:

FIG. 1 shows a top view of the end surface of an elastic gear wheel of a harmonic drive, FIG. 2 shows a longitudinal section through the harmonic drive according to FIG. 1, FIG. 3 shows a first elastic gear wheel according to an embodiment in a cross section, FIG. 4 shows the elastic gear wheel according to FIG. 3, in a perspective diagonal view, FIG. 5 shows the elastic gear wheel according to FIG. 3 in a longitudinal section, FIG. 6 shows a second elastic gear wheel according to an embodiment in a cross section, and FIG. 7 shows the elastic gear wheel according to FIG. 6 in a perspective diagonal view.

DETAILED DESCRIPTION OF THE DRAWINGS

FIGS. 1 to 3 show an exemplary embodiment of a gearing, indicated as a whole with the reference symbol 1, which is designed as a harmonic drive and has an elastic gear wheel 2. The gearing is part of an electric camshaft timer of an internal combustion engine in the form of a highly supported gearing. Reference is made to the cited prior art regarding the principle function of the gearing 1.

The gearing 1 has a housing component 3, which is powered directly, or indirectly via a drive mechanism (not shown), e.g., a belt or chain, by the crankshaft of the internal combustion engine, e.g., an Otto engine or a diesel engine. The rotational movement of the housing component 3 is transferred without play to the elastic gear wheel 2 via bolts 4 secured in the drive gear 3.

The attachment holes 5 in the elastic gear wheel 2, through each of which a bolt 4 is inserted, are circular. Heads of the bolts 4 are indicated by the numeral 6. On the whole, the gearing 1 has five bolts 4 for attaching the elastic gear wheel 2 to the housing component 3.

The deformations of the elastic gear wheel 2 are obtained through a wave generator, which comprises an outer ring 12 and an elliptical inner ring 10. The outer ring 12 adapts to the elliptical shape of the inner ring 10 in every operating state. The elastic gear wheel 2, in turn, encompasses the outer ring 12 directly, adapting to its non-circular shape. Ball bearings 11 act as roller elements that roll between the bearing rings 10, 12, i.e. the inner ring 10 and the outer ring 12, of the wave generator 9. The outer ring 12, assuming an elliptical shape, pushes the elastic gear wheel at two diametrically opposed points against a drive wheel 41 provided with internal teeth. This is connected in turn to a camshaft of the internal combustion engine for conjoint rotation therewith.

The elastic gear wheel 2 has a cylindrical, toothed section 15 and an adjoining flange 16, extending radially outward, wherein the holes 5 are located in the flange 16. The toothing 7 of the elastic gear wheel 2, an outer toothing in the present case, is located on the cylindrical section 15. The inner ring 10 of the wave generator 9 is rotated by an electric drive device (not shown). The shaft driving the inner ring 10 is a timer shaft; the gearing 1 as a whole is a gearing comprising three shafts.

The section shown in FIG. 2 intersects one of the bolts 4. The gearing 1 comprises a total of five separate circumferential sections 17, corresponding to the number of bolts 4. There is one attachment point 14 between each of the circumferential sections 17 in FIG. 2. The flange 16 is in contact with the housing component 3 at the attachment points 14, wherein the flange 16 in this embodiment is retained on the housing component 3 via the bolts 4, with an intermediate part 18 and an adaptor 19 placed therebetween.

FIGS. 3 to 5 show a first elastic gear wheel 2 according to an embodiment. The elastic gear wheel has a toothing 7 in the form of an outer toothing, which is disposed on a cylindrical section 15. The flange 16 adjoins the cylindrical section 15 at an angle of ca. 90°. There is therefore a bend 21 at the transition. The flange 16 has five attachment holes 5. Through holes 20 are disposed at the same radial position, but offset to the attachment holes 5, wherein these are disposed equidistant to one another and to the holes 5. The through holes 20 are in the form of slots, and disposed rotationally symmetrically, in order to make the flange more flexible in a rotationally symmetrical manner.

The elastic gear wheel 2 is screwed to a component, e.g. a chain wheel of a camshaft timer, via the holes 5.

The elastic gear wheel 2 in the second exemplary embodiment according to FIGS. 6 and 7 corresponds to the first exemplary embodiment, except for the positioning of the through holes 20 therein. It also has an annular projection 22, which divides the flange 16 into an outer flange region 23 and an inner flange region 24. The inner flange region 24 can be at an angle to the outer flange region 23. The through holes 20 are located at the radial position of the annular projection 22. Their angular position corresponds to that of the attachment holes 5, in order to optimally relieve the heavy loads to the regions surrounding the holes 5.

As a result, the regions surrounding the attachment holes 5 that are tensioned and thus particularly rigid and thus subjected to a load are relieved, and the elastic gear wheel 2 in the form of a flanged sleeve can be deformed to a greater extent.

LIST OF REFERENCE SYMBOLS 1 gearing
2 elastic gear wheel
3 housing component
4 bolt
5 hole
6 bolt head
7 toothing
8 connecting assembly
9 wave generator
10 inner ring
11 ball bearing
12 outer ring
13 drive gear
14 attachment point
15 cylindrical, toothed section
16 flange
17 separate circumferential section
18 intermediate part
19 adapter
20 through hole
21 bend
22 annular projection
23 outer flange region
24 inner flange region

The invention claimed is:

1. An elastic gear wheel for a harmonic drive, the elastic gear wheel comprising:
a toothed cylindrical section, and
a flange formed as an integral part of the toothed cylindrical section and having attachment holes at a spacing to an edge of the flange, wherein the flange has through holes located radially between the attachment holes and the toothed cylindrical section, located along a circumference between the attachment holes; and
wherein each of the through holes is spaced apart from another one of the through holes along the circumference and one or more of the through holes are disposed between a pair of the attachment holes along the circumference.

2. The elastic gear wheel according to claim 1, wherein the through holes are elongated holes.

3. The elastic gear wheel according to claim 1, wherein the number of through holes corresponds to the number of attachment holes.

4. The elastic gear wheel according to claim 3, wherein the through holes exhibit a constant radial width.

5. The elastic gear wheel according to claim 2, wherein the elongated holes are curved toward the attachment holes.

6. The elastic gear wheel according to claim 1, wherein the flange and the toothed cylindrical section are connected at a right angle bend, and the through holes are located at a spacing to the bend.

7. The elastic gear wheel according to claim 6, wherein the flange has an annular projection which divides the flange into an outer flange region and an inner flange region connected to the bend, wherein the attachment holes are formed in the outer flange region and the through holes are formed in the annular projection.

8. A harmonic drive that has an elastic gear wheel according to claim 1, and a drive gear with an internal toothing, which meshes with the toothed cylindrical section of the elastic gear wheel at two opposing points, wherein the elastic gear wheel is screwed thereto via the attachment holes.

9. An elastic gear wheel for a harmonic drive, the elastic gear wheel comprising:
a toothed cylindrical section extending annularly about an axis and having teeth;
a flange formed integrally with the toothed cylindrical section and extending radially outwardly therefrom, the flange having a plurality of through holes arranged circumferentially about the axis and a plurality of attachment holes arranged circumferentially about the axis that differ in size from the through holes and wherein a pair of the through holes are located circumferentially adjacent to one another and circumferentially between a corresponding pair of attachment holes.

10. The elastic gear wheel of claim 9, wherein the through holes are elongated along the flange.

11. The elastic gear wheel of claim 10, wherein the through holes each have a section that exhibits a constant radial width.

12. The elastic gear wheel of claim 9, wherein the flange and the toothed cylindrical section are connected at a right angle bend, the flange has an annular projection which divides the flange into an outer flange region and an inner flange region connected to the bend, and the attachment holes are formed in the outer flange region and the through holes are formed in the annular projection.

* * * * *